US008728426B2

(12) United States Patent
Sapoundjiev

(10) Patent No.: US 8,728,426 B2
(45) Date of Patent: May 20, 2014

(54) HYBRID REACTOR WITH TWO REACTION ZONES

(71) Applicant: Her Majesty the Queen in right of Canada, as represented by the Minister of Natural Resources, Ottawa (CA)

(72) Inventor: Hristo Sapoundjiev, Greenfield Park (CA)

(73) Assignee: Her Majesty the Queen in right of Canada, as represented by the Minister of Natural Resources, Ontario (CA)

( * ) Notice: Subject to any disclaimer, the term of this patent is extended or adjusted under 35 U.S.C. 154(b) by 0 days.

(21) Appl. No.: 14/077,586

(22) Filed: Nov. 12, 2013

(65) Prior Publication Data

US 2014/0072495 A1 Mar. 13, 2014

Related U.S. Application Data

(62) Division of application No. 13/518,144, filed as application No. PCT/CA2010/002011 on Dec. 17, 2010, now Pat. No. 8,609,052.

(51) Int. Cl.
*B01D 53/02* (2006.01)
(52) U.S. Cl.
USPC ...................................................... 423/245.1
(58) Field of Classification Search
None
See application file for complete search history.

(56) References Cited

U.S. PATENT DOCUMENTS 5,589,057 A  12/1996  Trimble et al.

2002/0090334 A1  7/2002  Stevens et al.

FOREIGN PATENT DOCUMENTS

CA  2192534 A1  6/1998

OTHER PUBLICATIONS

Patent Cooperation Treaty, PCT International Search Report and Written Opinion of the International Searching Authority for PCT/CA2010/002011 dated Apr. 6, 2011, 8 pages.
Patent Cooperation Treaty, PCT Notification of Transmittal of International Preliminary Report on Patentability for PCT/CA2010/002011 dated Mar. 28, 2012, 8 pages.
Nassiri Motlagh, Office Action Communication for U.S. Appl. No. 13/518,144 dated Dec. 7, 2012, 21 pages.
Nassiri Motlagh, Office Action Communication for U.S. Appl. No. 13/518,144 dated Apr. 12, 2013, 18 pages.
Nassiri Motlagh, Notice of Allowance and Fee(s) Due for U.S. Appl. No. 13/518,144 dated Aug. 15, 2013, 10 pages.

*Primary Examiner* — Emily Le
*Assistant Examiner* — Anita Nassiri Motlagh
(74) *Attorney, Agent, or Firm* — Stephen F. Swinton, Jr.; Hoffman Warnick LLC

(57) ABSTRACT

The invention relates to a hybrid reverse flow catalytic apparatus having two reaction zones: a homogeneous reaction zone in porous ceramic and a heterogeneous reaction zone with catalyst, arranged in two different catalyst beds. A first catalytic bed located in a central region of the reactor is provided with a low activity catalyst and a second catalyst bed located in a peripheral region of the reactor is provided with a high activity catalyst. The provision of two catalyst beds containing different catalysts reduces the effect of radial temperature gradients in the reactor and improves the overall efficiency of the reactor. The invention also relates to method of performing catalytic and thermochemical reactions in said apparatus.

9 Claims, 12 Drawing Sheets

HYBRID REACTOR WITH TWO REACTION ZONES

CROSS-REFERENCE TO RELATED APPLICATIONS

This application is a divisional application of co-pending U.S. patent application Ser. No. 13/518,144, filed 21 Jun. 2012, which is a US National Stage Application of PCT Application No. PCT/CA10/02011, filed 17 Dec. 2010, which claims the benefit of Canadian Patent Application No. 2,689,044, each of which is hereby incorporated herein.

FIELD OF THE INVENTION

The invention relates to hybrid flow reversal catalytic apparatus having two reaction zones: a homogeneous reaction zone in porous ceramic and a heterogeneous reaction zone with catalyst, arranged in two different catalyst beds. A first catalytic bed located in a central region of the reactor is provided with a low activity catalyst and a second catalyst bed located in a peripheral region of the reactor is provided with a high activity catalyst. The invention also relates to method of performing catalytic and thermochemical reactions in said apparatus. The invention is particularly suited to catalytic gas phase reactions, such as oxidizing ventilation air methane from coal mines or other methane and hydrocarbon emissions from the oil, gas, chemical and petrochemical industries.

BACKGROUND OF THE INVENTION

Flow reversal reactors, in which the flow of the reactants and products is periodically reversed, are well known in the field of chemical engineering. For example, U.S. Pat. No. 4,478,808 to Matros et al. is directed to a method of preparing sulphur trioxide by the oxidation of sulphur dioxide. Matros et al. discloses heat exchange/reaction zones each consisting of a layer of catalyst between two layers of inert heat exchange material. The reaction mixture flow along the catalyst bed is reversed periodically. U.S. Pat. No. 2,946,651 to Houdry is directed to the catalytic treatment of gas streams containing relatively small amounts of oxidizable impurities and discloses a gas permeable bed of solids which operate as a heat exchanger by periodically reversing the direction of flow of gas stream through the bed at such intervals that the hot zone of the bed is maintained generally within the central portion thereof, while the outer portion of the bed with respect to the direction of gas flow is maintained at a relatively low temperature. US Patent Application No. 2009/0101584 to Bos et al. is directed to a reverse-flow reactor comprising at least one catalyst bed which is preceded and followed by at least one bed containing selectively adsorbing material. U.S. Pat. No. 6,019,952 to Haupt is directed to a process for destroying organic contaminants in exhaust gas. Haupt discloses two reactors arranged in parallel where each reactor contains a plurality of serially arranged reaction zones with each reaction zone containing an upstream catalyst, a downstream absorbent and a heater. The arrangement of the catalyst, absorbent and heater may be varied.

In general, flow reversal reactors have heat media zones, the primary function of which is to pre-heat cold reactant gases to the proper temperature before the gases reach the reaction zone (i.e. the catalyst bed). In large-scale industrial reactors operating in dynamic regimes, radial in-homogeneities commonly arise. These radial in-homogeneities result in the formation of radial temperature gradients in the catalytic reaction zones of the reactor in which the central region of the reactor has a temperature greater than the temperature of a peripheral region of the reactor (i.e. near the reactor wall). In some instances, the temperature differential between these two regions may be more than 300° C.

As a result of the temperature differential between the central region and peripheral region of the reactor, two different regimes of operation are found in the reactor. A high temperature regime in the central region of the reactor where chemical conversion approaches 100% and a low temperature regime near the reactor wall where chemical conversion may be less than 30%. The result of this disparity is a decrease in the overall rate of chemical conversion and increased reactor inefficiently.

Several efforts have been made in order to alleviate this problem. For example, Canadian Patent No. 2,192,534 to Ratnani et al., directed to a method and apparatus for performing a gas phase exothermic reaction, discloses a reverse flow reactor in which a combustible feed gas mixture is passed through a first catalyst bed comprising a catalyst material having a low catalytic activity and subsequently passed through a second catalyst bed comprising a catalyst material having a high catalytic activity. However, passing the feed gas mixture through catalyst beds having different catalyst activity sequentially does not necessarily reduce or avoid radial in-homogeneities.

To overcome this issue, it is known in the art to increase the volume of the catalyst bed in industrial reactors. Increasing the volume of the catalyst bed increases the amount of time that the reaction gas is in contact with the catalyst surface, which increases the conversion rate near the reactor wall and therefore increases the total chemical conversion rate of the reactor. However, increasing the volume of the catalyst bed is undesirable economically because it increases the capital costs and operating costs of the reactor due to the need for more catalyst. Additionally, when the concentration of the incoming reactant gas varies, an increase in the volume of catalyst is insufficient to reach a conversion rate of over 95%.

It would therefore be desirable to have a flow reversal reactor in which the effect of radial in-homogeneities is reduced or avoided so that the chemical conversion rate is similar throughout the entire reactor.

SUMMARY OF THE INVENTION

The invention seeks to provide a hybrid flow reversal catalytic apparatus with improved efficiency, having two different catalyst beds in the reaction zone. A central region of the reaction zone is provided with a low activity catalyst while the peripheral region of the reaction zone (i.e. nearer to the reactor wall) is provided with a high activity catalyst. Providing the reaction zone with catalysts having different activity levels compensates for the different reaction rates in the central region of the reactor versus the peripheral region of the reactor due to differences in reactor temperature. The invention also seeks to provide method for performing of catalytic and thermochemical processes in said apparatus.

Preferably, the low activity catalyst is a non-noble metal oxide catalyst or a perovskite based catalyst.

Preferably, the high activity catalyst is a noble metal catalyst on a base of palladium or platinum or oxide type catalyst on a base of cobalt or chromium.

Preferably, the ratio of the high activity catalyst volume to low activity catalyst volume is 0.2 to 1.0.

Preferably, the ratio of high activity catalyst surface area to low activity catalyst surface area is 0.2 to 0.7.

The invention additionally seeks to provide two different reaction zones. The first reaction zone is the catalyst zone, as described above, in which a heterogeneous reaction takes place. The second reaction zone is provided in beds of porous material, which are positioned above the catalyst zone. Preferably, the porous material is of random packing, structured monolithic or semi-structured form, having porosity in the range between 0.5 and 0.85. More preferably, the porous material is a porous ceramic material. However, other materials that have large surface area and good thermo-capacity may also be used. In the porous ceramic beds, a gas phase homogeneous reaction takes place. Beds of porous material are positioned also before the catalyst beds. Preferably, the porous material is of random packing, structured monolithic or semi-structured form, having porosity in the range between 0.5 and 0.85. These porous ceramic beds themselves assist in the mixing of the chemicals in the reactor. In addition, the ceramic beds are advantageously provided with mixing devices to further assist in the mixing process. The porous ceramic beds also increase the thermal capacity of the reactor in the mixing zone, which is important for the optimal operation of the reactor in the event of fluctuations in concentration of the incoming reactant gases.

Preferably, the maximum temperature of the reactor is controlled to prevent overheating of the catalyst.

Preferably, the reactor of the invention is used for catalytic gas phase reactions, such as oxidizing ventilation air methane from coal mines. The reactor of the invention may also be used to treat other methane emissions from the oil, gas, chemical and petrochemical industries, or used in $NO_x$ catalytic reduction, hydrocarbon partial oxidation and destruction of toxic volatile organic compounds (VOCs).

Preferably, the reactor of the invention is used for thermochemical processes such as cracking, and gasification.

BRIEF DESCRIPTION OF THE DRAWINGS

The invention will now be described with reference to the drawings, in which.

DETAILED DESCRIPTION OF THE INVENTION

Figure 1:
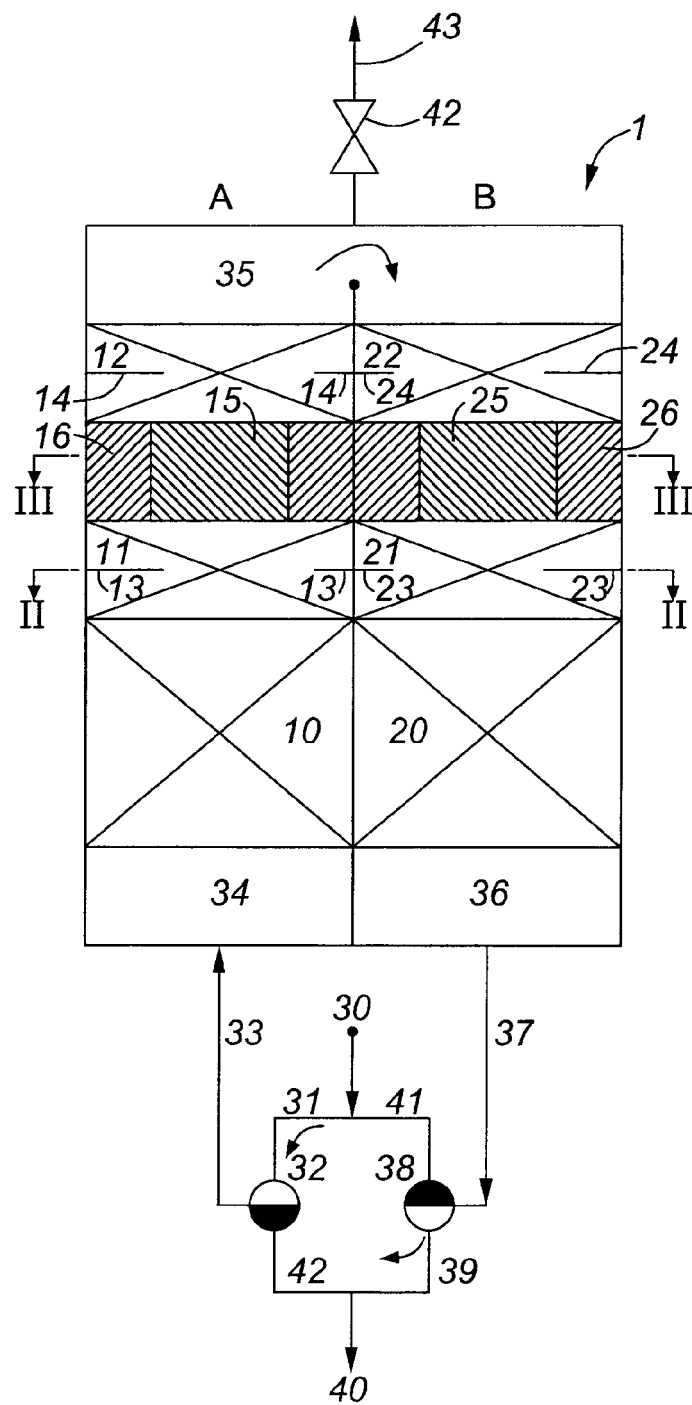
FIG. 1 is a sectional side view of a first embodiment of the invention.
Figure 2:
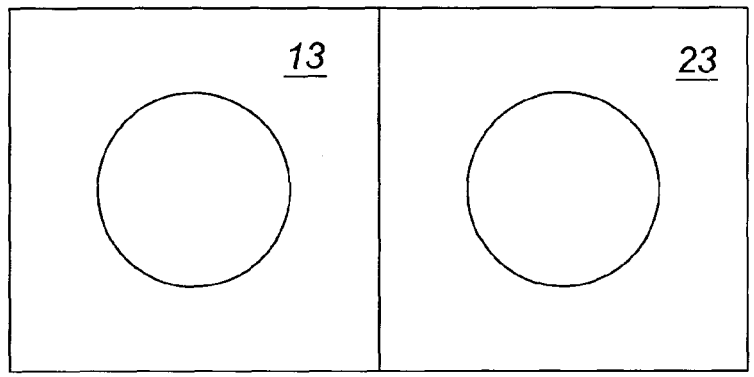
FIG. 2 is a sectional top view of the first embodiment of the invention though a porous ceramic bed, taken along the line II-II in FIG. 1.
Figure 3:
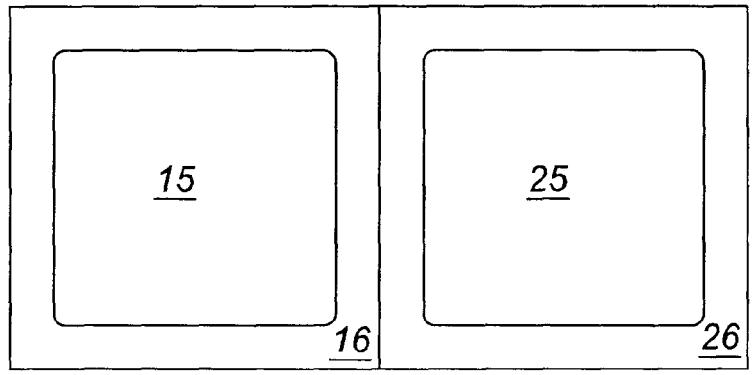
FIG. 3 is a sectional top view of the first embodiment of the invention through the catalyst zone, taken along the line III-III in FIG. 1.

Referring to FIGS. 1 to 3, a flow reversal reactor (1) having a cylindrical or rectangular cross section is shown having two identical (or mirror-image) sections (A) and (B), which are in fluid connection with each other. Each section has a heat media bed (10) and (20), which is used as a regenerative heat exchanger. The primary function of heat media beds (10) and (20) is to pre-heat the incoming cold reactant gases to the proper temperature, before reaching the reaction zones.

Figure 4:
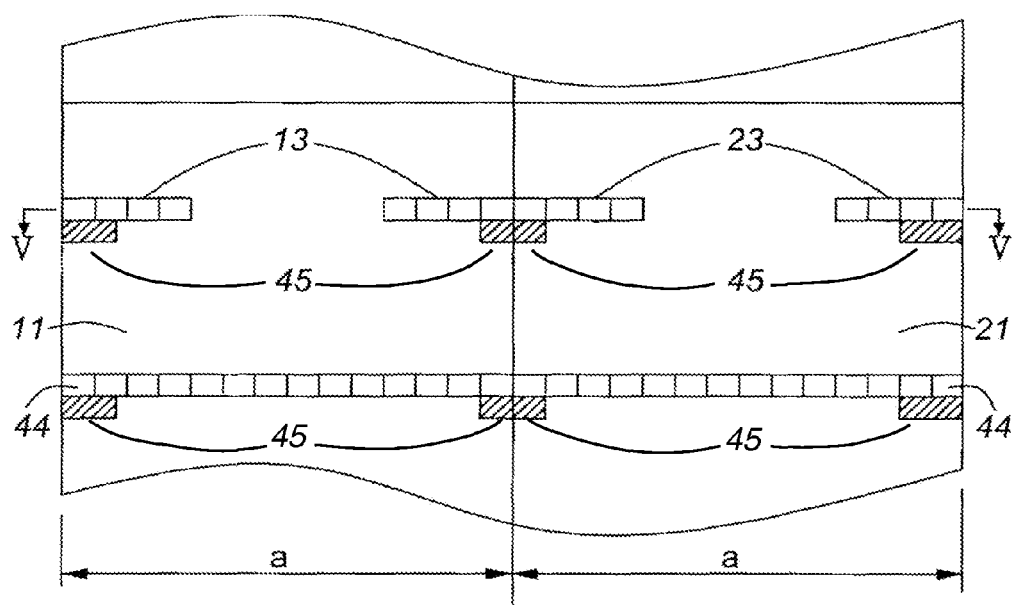
FIG. 4 is an enlarged partial sectional side view of a first embodiment of the invention.
Figure 5:
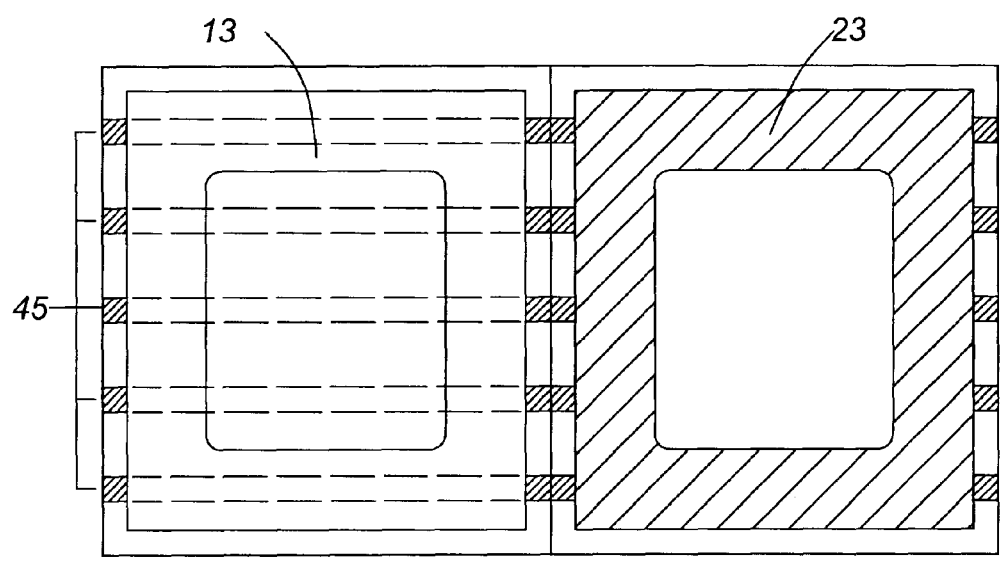
FIG. 5 is a sectional top view of the first embodiment of the invention, taken along line V-V in FIG. 4.

Sections (A) and (B) each further comprise porous ceramic material beds (11), (12), (21) and (22). The porous ceramic material beds, (12) and (22) provide a region where a gas phase homogenous reaction takes place. The porous ceramic materials beds (11) and (21) provide a region improving gas homogeneities in radial direction. The porous ceramic material beds (11) and (12) incorporate mixing devices (13) and (14) and the porous ceramic material beds (21) and (22) incorporate mixing devices (23) and (24), which further assist in the mixing of the chemical reactants. Referring to FIGS. 4 and 5, porous ceramic material beds (11) and (21) are supported on a supporting grid (44), which is supported by support beams (45). Mixing devices (13) and (23) are supported by additional support beams (45). Preferably, the ratio of mixing means surface area to the total reactor surface area is 0.3 to 0.9.

A heterogeneous conversion of the reaction gas takes place in catalyst beds (15) and (16) in section (A) and catalyst beds (25) and (26) of section (B). As most clearly shown in FIG. 3, catalyst beds (15) and (25) are located in a central region of a horizontal plane of the reactor (1) and contain a low activity catalyst. A low activity catalyst is desired in the central region of the reactor (1) because this is where reactor temperatures are greatest and therefore a naturally higher rate of conversion occurs here. Preferably, the low activity catalyst is a non-noble metal oxide catalyst or a perovskite based catalyst. As most clearly shown in FIG. 3, catalyst beds (16) and (26) are located near the reactor (1) wall and contain a high activity catalyst. A high activity catalyst is desired near the reactor walls where reactor (1) temperatures are lower. Preferably, the high activity catalyst is a noble metal catalyst on a base of palladium or platinum or oxide type catalyst on a base of cobalt or chromium. The relative volumes of the high activity catalyst and low activity catalyst depend on a number of factors including the size of the reactor, the reactor's design, the flow rate of the reacting gas and the configuration of the catalyst beds (i.e. whether they are structured, semi-structured or randomly packed). Preferably, the ratio of high activity catalyst volume to low activity catalyst volume is 0.2 to 1.0.

The reacting gas after the first porous beds (11) and (21) is preheated to selected temperature and is mixed well and equally distributed in radial direction.

The reactor (1) is connected to pipes and a switching valve system which control the directional flow direction of reaction gas through the reactor (1). The flow direction switching system comprises inlet lines (30), (31) or (41), three way valves (32) and (38) and outlet lines (40), (39), or (42). Depending on the orientation of valves (32) and (38), the reaction mixture may first enter section (A) through pipes (30), (31), (33) and then section (B) before leaving the reactor (1) through the switching valve (38) and lines (37), (39) and (40), or conversely may first enter section (B) through lines (30), (41) and (37) and then section (A) before leaving the reactor (1) through the switching valve (32) and lines (33), (42) and (40). The reactor (1) operates in a flow reversal regime and after a certain period of time, the flow is reversed through the selective use of valves (32) and (38).

Before the reactor (1) is operated, sections (A) and (B) are initially pre-heated by an external heat source mainly to raise the temperatures of sections (A) and (B) to at least 430° C. Preferably, the external heat source is hot air.

Figure 6:
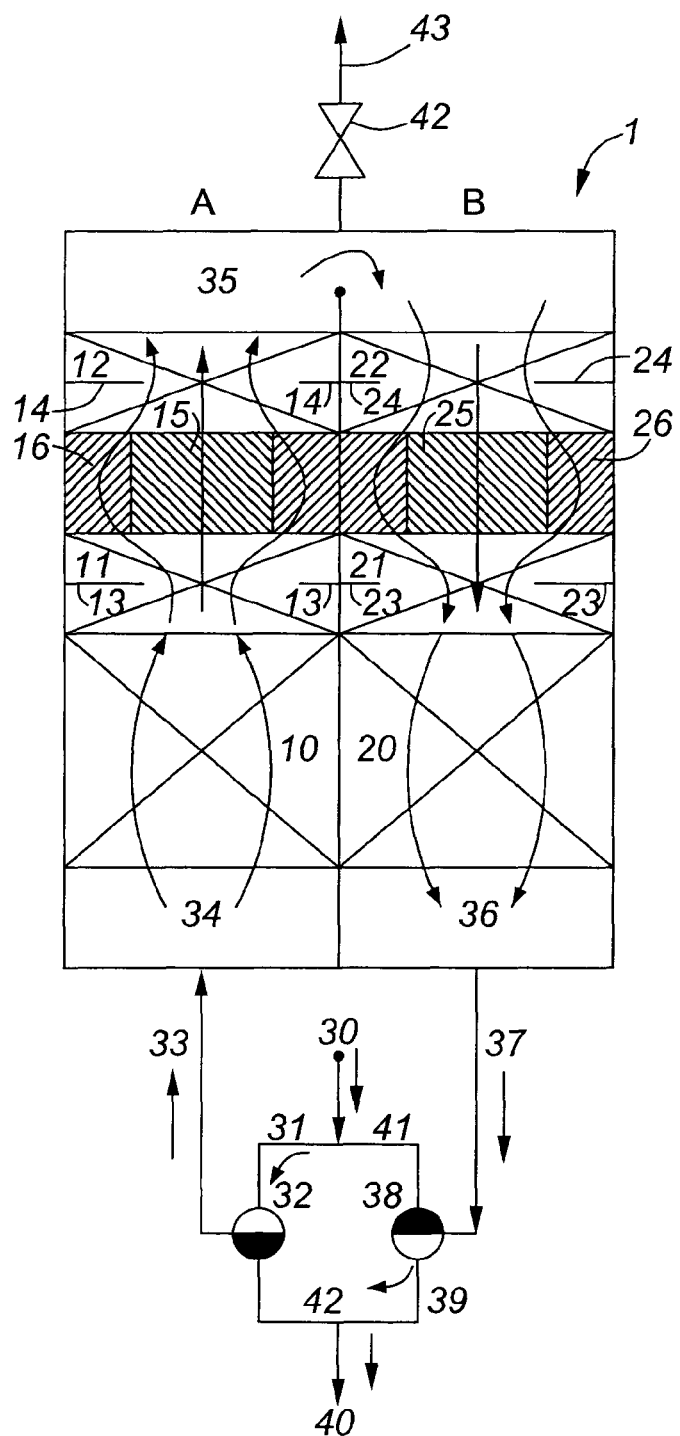
FIG. 6 is a sectional side view showing the reaction flow through the reactor with the reactants entering a first section (A) of the reactor.

Referring to FIG. 6, the reactor (1) is shown with valves (32) and (38) arranged so that the reaction gas enters a first section (A) of the reactor (1). An incoming gas mixture, containing reactant gases, enters the reactor (1) through lines (30) and (31), valve (32) and line (33). The incoming gas mixture enters gas distribution section (34) and the hot media bed (10), where the temperature of the incoming gas mixture is raised to at least 430° C. Preferably, the incoming gas stream is ventilation air methane (VAM), with a methane concentration of 0.1 to 1.0 v/v % at a temperature of 20° C. The reaction mixture enters the porous ceramic bed material (11) where the gas is mixed intensively. After passing through porous bed (11), the reaction mixture enters catalyst beds (15) and (16), where exothermic, heterogeneous reaction takes place converting almost 80% of the present methane to water and carbon dioxide. The reaction mixture's temperature in catalytic zone is in the interval of 600 to 850° C. After passing through the catalyst beds (15) and (16), the reaction mixture passes through porous ceramic material bed (12) of section (A) additionally converting methane by homogeneous reaction, before moving into section (B) of the reactor (1). If the temperature in porous ceramic material beds (12) rises above 900° C., a portion of the hot gases of the reaction mixture is vented from a hot zone (35) of the reactor (1) through valve (42) and line (43), where the hot gas after heat utilization is vented to the atmosphere. The rest of the reaction mixture then passes through porous material (22) where methane is converted by homogeneous reaction and the catalyst beds (25) and (26) where the remaining methane is almost totally (99.5%) converted by heterogeneous reaction. After exiting catalyst beds (25) and (26), the hot reaction gas heats the porous ceramic material bed (21), heat media (20), and with temperature below 100° C. leaves section (B) of the reactor (1) through distribution section (36), line 37, valve (38) and through lines (39) and (40).

Figure 7:
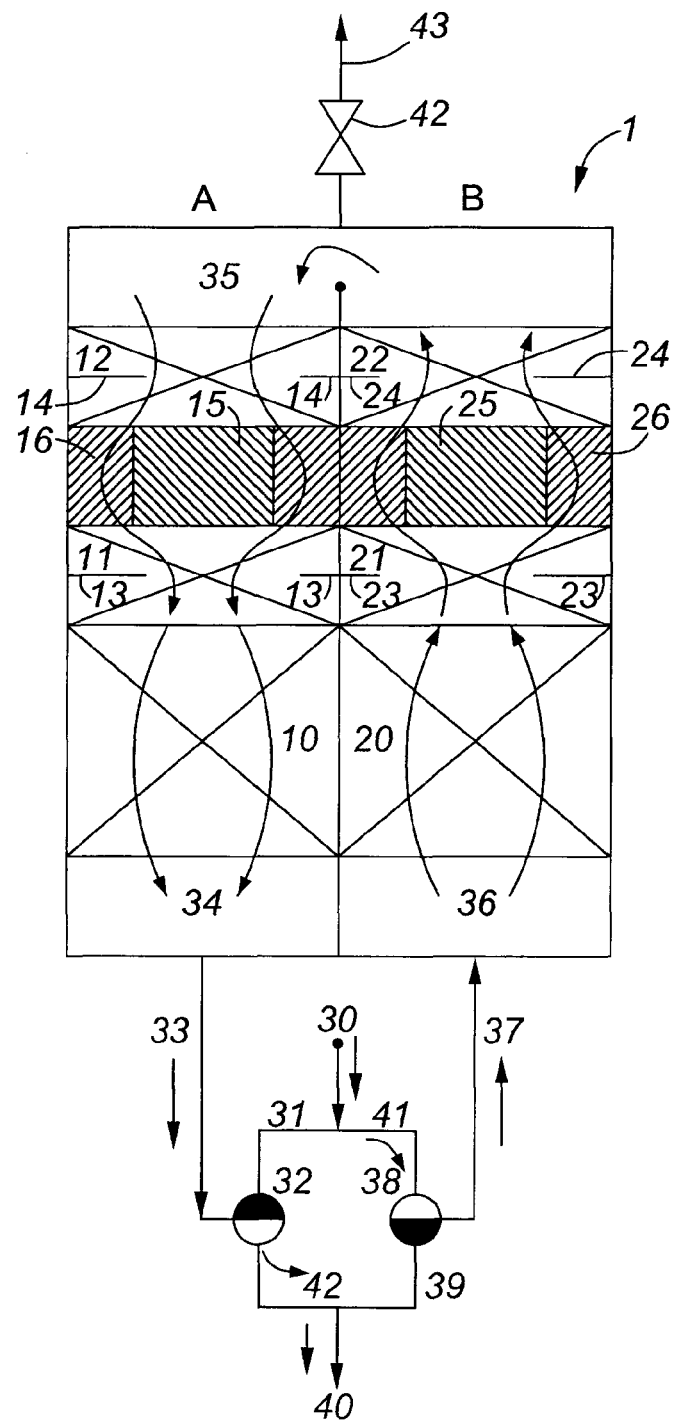
FIG. 7 is a sectional side view showing the reaction flow through the reactor with the reactants entering a first section (B) of the reactor.

Referring to FIG. 7, the reactor (1) is shown with valves (32) and (38) arranged so that the reaction gases enters first section (B) of the reactor (1). An incoming gas mixture, containing reactant gas, enters the reactor (1) through lines (30) and (41), valve (38) and line (37). The incoming gas mixture enters gas distribution section (36) and the hot media bed (20), where the temperature of the incoming gas mixture is raised to at least 430° C. Preferably, the incoming gas stream is ventilation air methane, with a methane concentration of 0.1 to 1.0 v/v % at a temperature of 20° C. The reaction mixture enters the porous ceramic material bed (21) where the gas is mixed intensively. After passing through porous ceramic material bed (21), the reaction mixture enters catalyst beds (25) and (26), where exothermic, heterogeneous reaction takes place converting almost 80% of the methane to water and carbon dioxide. The reaction mixture's temperature in catalytic zone is in the interval of 600 to 850° C. After passing through the catalyst beds (25) and (26), the reaction mixture passes through porous ceramic material bed (22) of section (B) additionally converting methane by homogeneous reaction, before moving into section (A) of the reactor (1). If the temperature in porous ceramic material bed (22) rises above 900° C., a portion of the hot gases of the reaction mixture is vented from a hot zone (35) of the reactor (1) through valve (42) and line (43). The rest of the reaction mixture then passes through porous material (12) where methane is converted by homogeneous reaction, catalyst beds (15) and (16) where the remaining methane is almost totally (99.5%) converted by heterogeneous reaction. After exiting catalyst beds (15) and (16), the hot reaction gas heats the porous ceramic material bed (11), heat media (10), and with temperature below 100° C. leaves section (A) of the reactor (1) through the distribution section (34), line 33, and valve (32) and through lines (42) and (40).

EXPERIMENTAL RESULTS

The reactor body is configured of two cylindrical parts (A) and (B) in fluid communications with each other. For air and natural gas, the flow rate is measured by mass flow meter. To simulate the lean methane-air mixtures in the range of methane concentration 0.2 to 1.0 v/v %, natural gas (95% of methane) was mixed with air. To evaluate the total methane conversion rate, the inlet/outlet methane content was measured using TROLEX™ gas analyzer. The outlet methane content was measured also by Gas Chromatograph (GC) analyzer for more precision.

During the reactor operation part of the reaction heat is withdrawn in the mid-section of the reactor. The hot air is cooled down in water gas heat exchanger before rejected to the atmosphere. The flow rate of the extracted hot air is controlled by valve.

Automatic control system is used to control the duration of the switching cycle times and the maximum temperature in the reactor.

Experiments were conducted where the incoming gas streams with methane concentration ranging from 0.3 to 1.0 v/v %, which is a typical methane concentration range in the ventilation air methane. The flow rate of inlet gas mixture was varied in the range from 50 to 130 kg/h. Methane contents of inlet and outlet gas were measured to evaluate the total conversion. As illustrated in Table 1 below, almost at all experiments have a total conversion rate of about more than 98%.

TABLE 1

| | $CH_4$(MicroGC) | | |
|---|---|---|---|
| Flow Kg/H | Methane Concentration Inlet % | Methane Concentration Outlet % | Methane Conversion Outlet % |
| 120 | 0.85 | 0.001 | 99.9 |
| 120 | 0.65 | 0.001 | 99.95 |
| 100 | 0.55 | 0.001 | 99.5 |
| 100 | 0.79 | 0.001 | 99.7 |
| 115 | 0.60 | 0.010 | 98.9 |
| 130 | 0.85 | 0.005 | 98.8 |

In some cases the methane content was measured at the mid section of the reactor, where the hot gas is extracted out of the reactor. As illustrated in Table 2 below (at 700° C., 100 kg/h air flow), the methane conversion at that point of the reactor is between 90 to 97%.

TABLE 2

| Sampling Port | $CH_4$ MicroGC | Combustion efficiency |
|---|---|---|
| Inlet | 0.79 | n.a. |
| Mid-section of the reactor | 0.05 | 93.4 |
| Outlet of the reactor | 0.002 | 99.7 |

Figure 8:
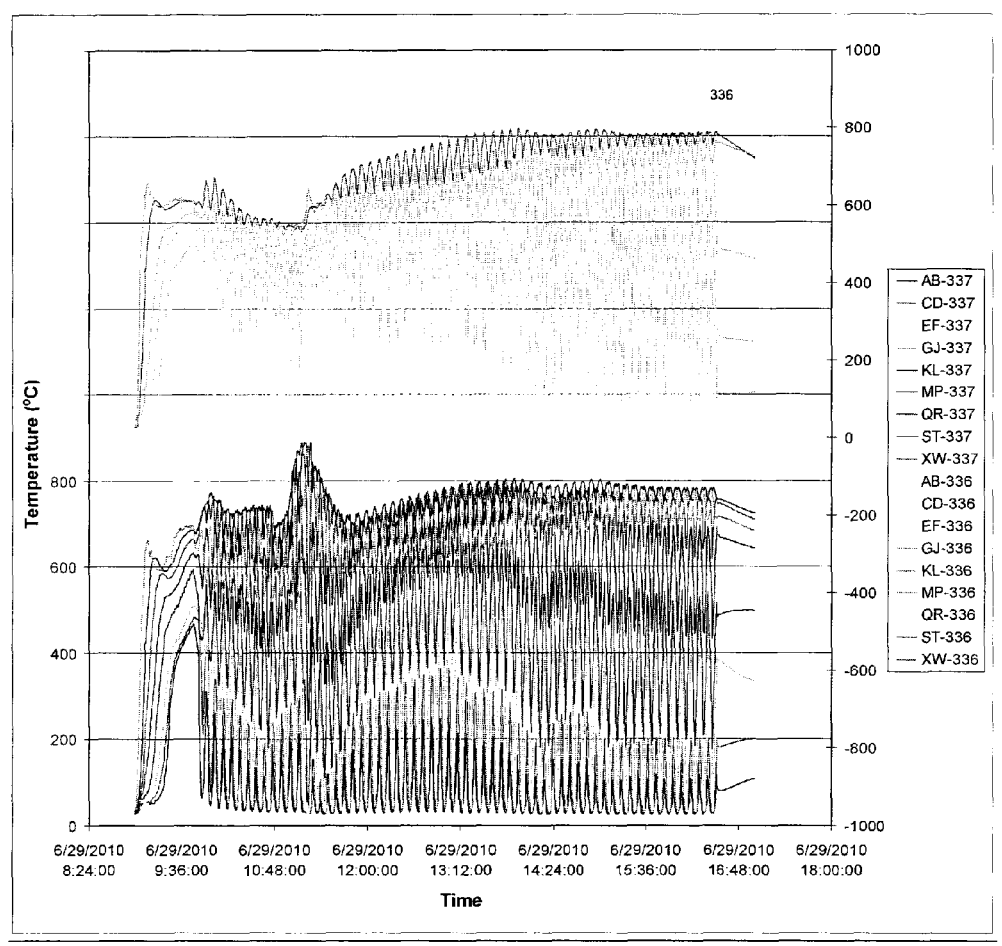
FIG. 8 is an axial temperature profile versus reaction time.

Temperatures were taken during the stable phases of the reaction at various zones along the central axis of each reactor section and various radial distances away therefrom. In some experiments, as illustrated at FIGS. 8 and 9, a methane air mixture with a methane concentration of 0.75 v/v % was introduced into the reactor at an inlet flow rate of 100 kg/h and temperature of 20° C.

Figure 9:
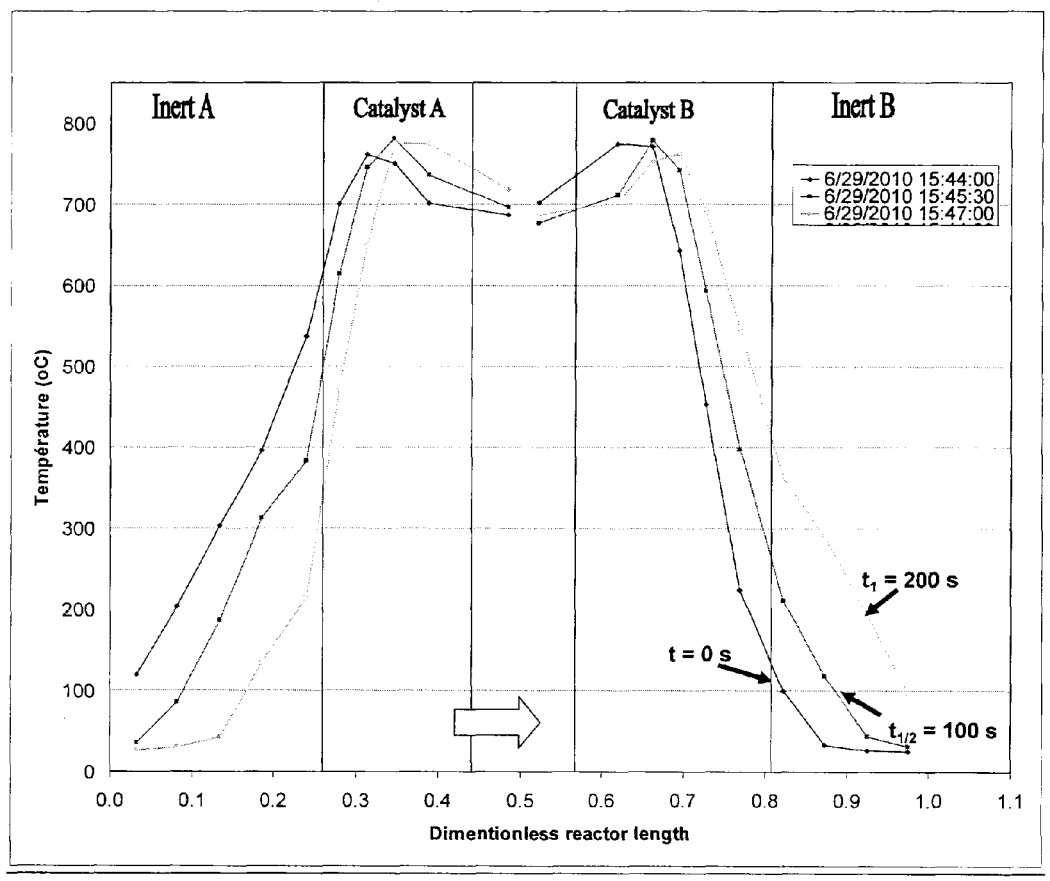
FIG. 9 is an axial temperature profile versus reactor length.

FIG. 9, along reactor axis, illustrates that during the each semi-cycle, the temperature in the catalyst reaction zones is achieved an optimal range 600-800° C., which results in total methane conversion rate of 99.5%.

Figure 10:
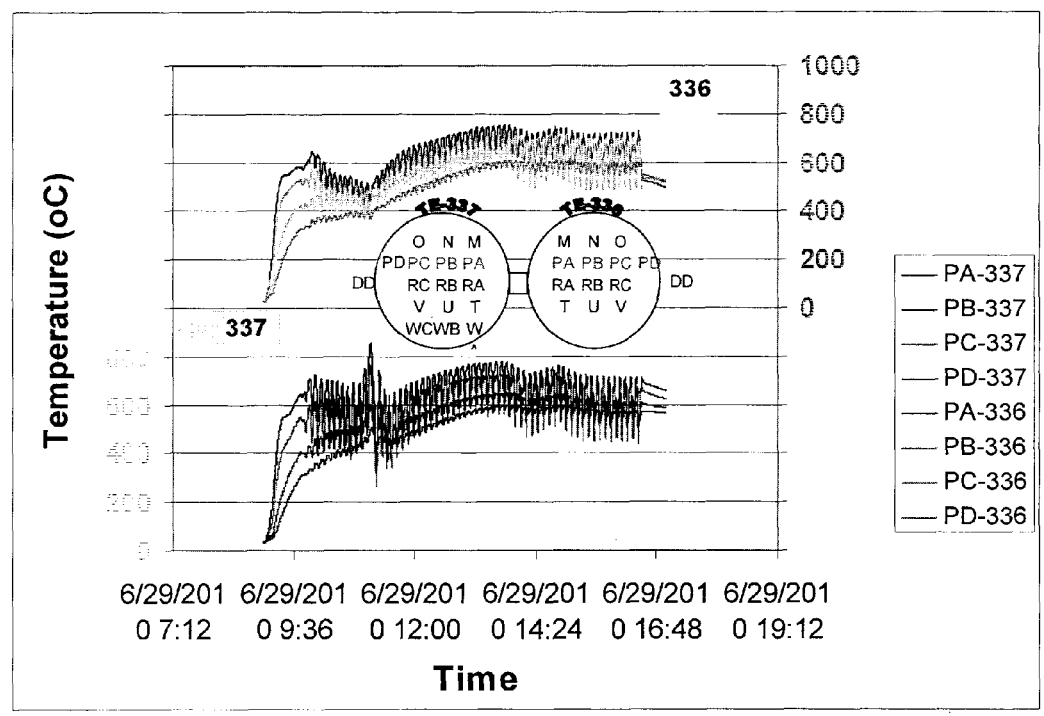
FIG. 10 is a radial temperature profile versus reaction time.
Figure 11:
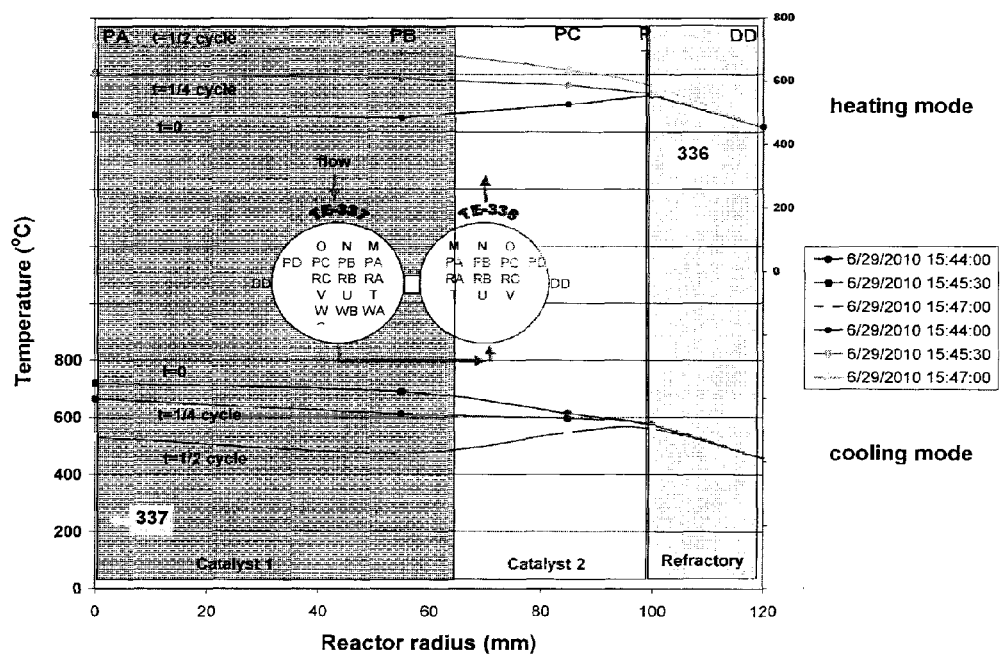
FIG. 11 is a temperature profile during one semi-cycle.

In terms of the radial distribution of the temperatures, as illustrated in FIGS. 10 and 11, maintaining an average temperature of about 600° C. for the catalyst beds (15), (16), (25) and (26) would result in a total methane conversion rate of about 99.5%. It is further observed that during semi-cycles, i.e. one reactor section is in the heating mode and the other reactor section is in cooling mode, maintaining a temperature of above 500° C. at the low temperature catalyst zones (16) and (26) would produce a total methane conversion rate of about 99.5%

Figure 12:
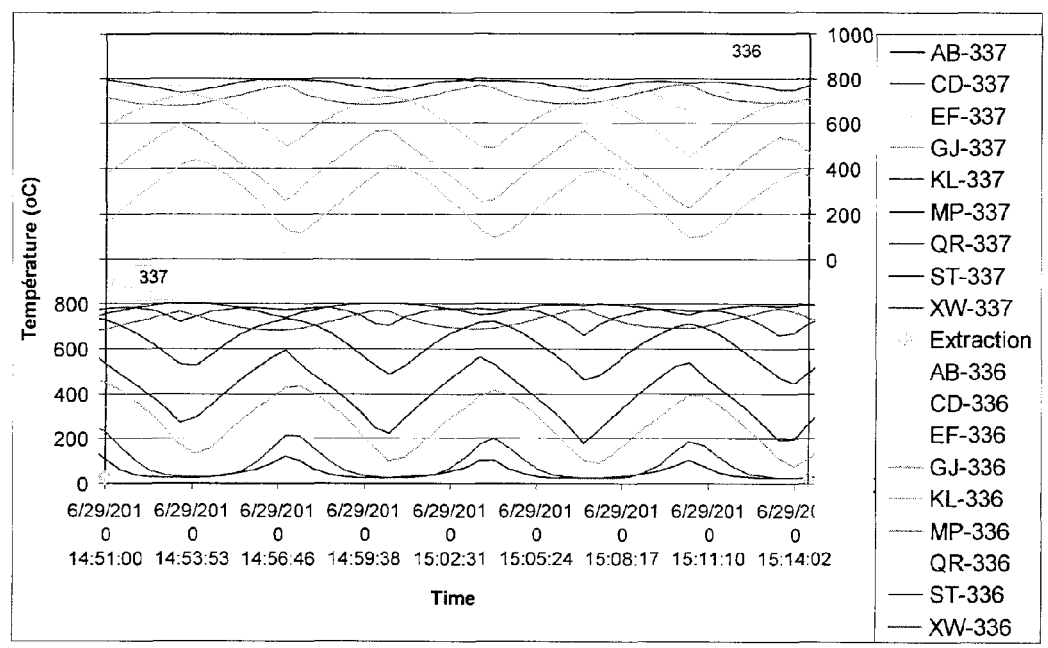
FIG. 12 is a temperature profile during the heat extraction.
Figure 13:
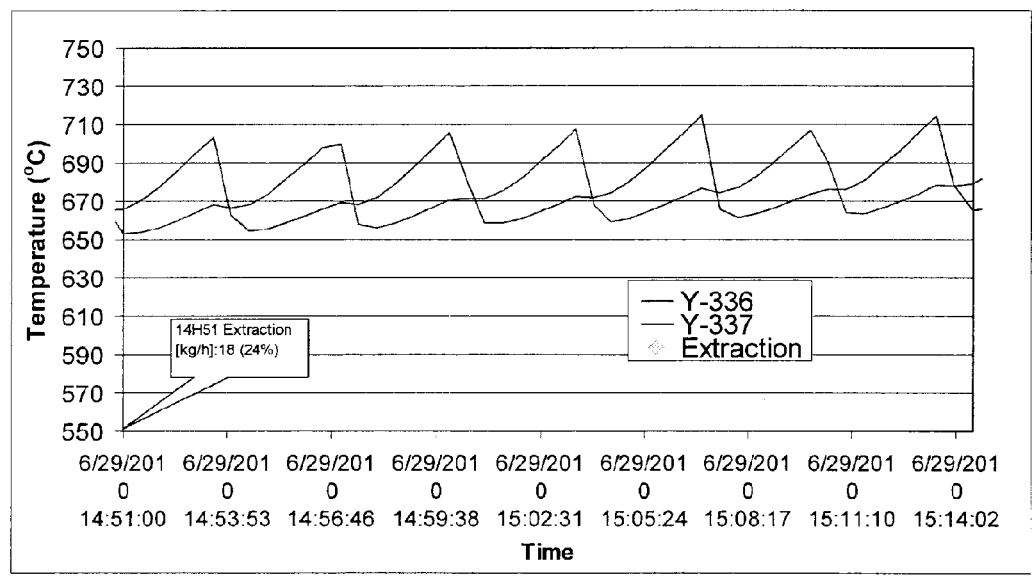
FIG. 13 is a temperature evolution profile of the extracted hot air.

In addition, temperature profiles as illustrated in FIGS. 12 and 13 (hot air flow rate is 18 kg/h, about 20% of the inlet flow rate), which were obtained during the heat extraction period (i.e. the venting of a portion of the hot gases of the reaction mixture from hot zone (35) of the reactor) indicate that the average temperature of the extracted hot air is about 650° C. This high temperature air can be used to produce hot steams or electricity.

As shown by the experiments, the hybrid reactor disclosed herein has, inter alia, the following advantages:
improving the methane destruction from 97.5% to 99.5% by elimination of temperature gradients in radial direction of the reactor, thereby increasing reactor productivity;
efficient reactor operation with a 30% less catalyst in volume in comparison with the conventional reactor and decreasing operating cost;
performing the process at at a relatively low temperature of about 700° C. and eliminate the need of expensive materials for the reactor design;
efficient initial reactor preheating operation and save of energy; and
about 20% of the inlet reaction gas can be extracted at the mid-section of the reactor at temperature 650° C. for further utilization resulting in clean energy production.

The invention claimed is:

1. A method for operating a catalytic reactor, comprising:
   (a) pre-heating reactant gas;
   (b) simultaneously reacting the reactant gas with a high temperature active catalyst and a low temperature active catalyst in a first heterogeneous catalytic reaction;
   (c) reacting the reactant gas in a first gas phase homogeneous reaction;
   (d) reacting the reactant gas in a second gas phase homogeneous reaction; and
   (e) simultaneously reacting the reactant gas with a high temperature active catalyst and a low temperature active catalyst in a second heterogeneous catalytic reaction.

2. A method according to claim 1, further comprising the step after step (e),
   (e.1) repeating steps (b) to (e) repeated in reverse order.

3. A method according to claim 1, further comprising the step after at least step (c),
   (c.1) venting product gases from the reactor.

4. A method according to claim 1, wherein 80% by mass of the reactant gas is converted by heterogeneous catalytic reaction step (b).

5. A method according to claim 1 wherein 20% by mass of the reactant gas is converted in steps (c), (d) by homogeneous reaction and in step (e) by heterogeneous catalytic reaction.

6. A method according to claim 1, wherein the temperature of the reactant gas in step (a) is raised to at least 430° C.

7. A method according to claim 1, wherein steps (b) to (e) are performed at a temperature in a range between 600 to 850° C.

8. A method according to claim 1, wherein the reactant gas is ventilation air methane.

9. A method according to claim 1, wherein the reactant gas is methane or other hydrocarbon emissions from oil, gas, chemical and petrochemical industries.

* * * * *